(12) United States Patent
Mikiya et al.

(10) Patent No.: US 7,121,773 B2
(45) Date of Patent: Oct. 17, 2006

(54) ELECTRIC DRILL APPARATUS

(75) Inventors: Toshio Mikiya, Tokyo (JP); Keisuke Shimada, Tokyo (JP); Munenori Yamaguchi, Tokyo (JP); Takashi Chiba, Tokyo (JP); Kenji Ohtsuka, Tokyo (JP)

(73) Assignee: Nitto Kohki Co., Ltd., Tokyo (JP)

( * ) Notice: Subject to any disclaimer, the term of this patent is extended or adjusted under 35 U.S.C. 154(b) by 0 days.

(21) Appl. No.: 10/674,249

(22) Filed: Sep. 29, 2003

(65) Prior Publication Data
US 2005/0025586 A1 Feb. 3, 2005

(30) Foreign Application Priority Data

| Aug. 1, 2003 | (JP) | ............................... 2003/284837 |
| Aug. 29, 2003 | (JP) | ............................... 2003/307743 |

(51) Int. Cl.
*B23B 39/00* (2006.01)
(52) U.S. Cl. ................... 408/5; 408/6; 408/8; 408/124; 408/135
(58) Field of Classification Search ................... 408/5, 408/6, 8, 9, 10, 11, 76, 124, 138, 204; 361/31, 361/93.1, 93.9
See application file for complete search history.

(56) References Cited

U.S. PATENT DOCUMENTS

| 3,609,056 | A | | 9/1971 | Hougen |
| 4,473,329 | A | * | 9/1984 | Aoshima et al. ............... 408/11 |
| 4,543,723 | A | * | 10/1985 | Bortfeld et al. ................ 30/381 |
| 4,549,097 | A | * | 10/1985 | Ulmer ......................... 307/326 |
| 4,559,577 | A | | 12/1985 | Shoji et al. |
| 4,604,006 | A | | 8/1986 | Shoji et al. |
| 4,767,245 | A | * | 8/1988 | Shoji et al. .................. 408/204 |
| 4,780,654 | A | * | 10/1988 | Shoji et al. .................. 318/434 |
| 5,719,732 | A | * | 2/1998 | Nagahama et al. ........... 361/29 |
| 6,072,675 | A | * | 6/2000 | Murakami et al. ............ 361/23 |
| 6,102,632 | A | | 8/2000 | Potter et al. |
| 6,280,123 | B1 | | 8/2001 | Gill |

FOREIGN PATENT DOCUMENTS

| JP | 03-078205 | 4/1991 |
| JP | 3015010 | 6/1995 |
| JP | 2002-46007 | 2/2002 |
| JP | 2003-025122 | 1/2003 |

* cited by examiner

*Primary Examiner*—Monica Carter
*Assistant Examiner*—Michael W. Talbot
(74) *Attorney, Agent, or Firm*—Brinks Hofer Gilson & Lione

(57) ABSTRACT

An electric drill apparatus having a low profile is provided which comprises an annular cutter, a motor for rotating the annular cutter, a rotary shaft assembly for rotating the annular cutter attached to its leading end about a rotating, a rotation reduction mechanism disposed between the motor and rotary shaft assembly for transmitting a driving force of the motor to the annular cutter through the rotary shaft assembly, a feed mechanism responsive to an operation of a manual handle, for moving the rotary shaft assembly along with a straight line to advance or retract the annular cutter attached to the rotary shaft assembly with respect to a workpiece, and an adhesion base for securing the electric drill apparatus to the workpiece. The annular cutter has a plurality of cutting blades comprised of cemented carbide tips fixed on its lower end, thereby it is capable of rotating at a high speed. The rotary shaft assembly has a rotating shaft which rotates in a direction different from that of a rotating shaft of the motor, thereby the drill apparatus has a low profile.

21 Claims, 4 Drawing Sheets

US 7,121,773 B2

ELECTRIC DRILL APPARATUS

BACKGROUND OF THE INVENTION

The present invention relates generally to an electric drill apparatus, and more particularly to an electric drill apparatus having a low profile and adapted to automatically re-drive a drill motor when rotation of the drill motor is stopped in the event of overloading.

Nowadays, in new construction, repair and the like of a variety of buildings and so on, there exists a need for drilling workpieces comprising structural materials such as a steel cage and the like at or near positions at which the workpieces are attached to buildings. It is therefore necessary to transport an electric drill apparatus to workpiece assembly places. In addition, a drilling operation must be often performed in a relatively narrow space at or near a position at which a structural material or workpiece is attached. Thus, to enable easy transportation and operation in narrow operating spaces, a reduction in size and weight is required for electric drill apparatuses.

A conventional electric drill apparatus typically comprises a slide mechanism which is automatically or manually movable in a vertical direction along a side surface of a body of the apparatus. The electric drill apparatus further comprises a motor, an annular cutter movable in the vertical direction by way of the slide mechanism, and a transmission mechanism for transmitting power of the motor to the annular cutter, which are arranged in the vertical direction or in the same direction as that of movement of the slide mechanism. Such vertically-arranged electric drill apparatuses are generally large in size, and can thus be only used in limited operation areas and have limited portability.

In contrast, WO 00/54915 describes an electric drill of a relatively low profile, in which a slide mechanism for sliding an annular cutter has a rotation axis which is substantially perpendicular to a rotation shaft of a drill motor. Such a low profile type electric drill apparatus is reduced in overall length as compared with the vertically-arranged type, and its compact size increases its portability.

In addition, Japanese Patent Publication (Kokoku) No. 3-78205 and Japanese Patent Public Disclosure (Kokai) No. 2003-25122 describe vertically arranged type electric drill apparatuses, each of which comprises a function of automatically stopping driving of a motor in the event of overloading.

However, such a low profile type electric drill apparatus as above, which is small in size and light in weight suffers from a drawback in that it has a limited drilling capability since only a small adhesive force acting on an electromagnetic base is employed to secure the electric drill apparatus on a workpiece.

Also, although the automatic electric drill apparatuses described in the above Japanese Official Gazettes have an automatic stop function when motor overload occurs, the function is provided to an electric drill apparatus comprising an automatic shift mechanism which moves an annular cutter in a vertical direction. There exists no electric drill apparatus having a manual shift mechanism for an annular cutter and a control means for automatically stopping driving of a motor when motor overload occurs. Further, there exists no electric drill apparatus having a function of re-driving a motor after it has been automatically stopped due to motor overload.

SUMMARY OF THE INVENTION

The present invention has been made in view of the foregoing problems experienced in the prior art electric drill apparatuses exemplified above.

It is an object of the present invention to provide a low profile type electric drill apparatus having a reduced size and weight.

It is another object of the present invention to provide a low profile type electric drill apparatus which is capable of improving adhesivity to a workpiece, in a case of a small size and lightweight apparatus.

It is a further object of the present invention to provide an electric drill apparatus which is capable of automatically driving a motor again, which has been automatically stopped due to motor overload, and which has a simple configuration to improve workability.

It is a yet further object of the present invention to provide an electric drill apparatus which is capable of recognizing both a normal and overload work condition of a motor.

To achieve the above objects, the present invention provides, in a first aspect, an electric drill apparatus having a low profile, which comprises:

an annular cutter for cutting at a high rotational speed, and having a plurality of cutting blades comprised of cemented carbide tips fixed on its lower end;

a motor for rotating at a high speed suitable for a cutting operation of the annular cutter with the cemented carbide tips;

a rotary shaft assembly for rotating the annular cutter attached to its leading end about a rotating shaft which rotates in a direction different from that of a rotating shaft of the motor;

a rotation reduction mechanism disposed between the motor and rotary shaft assembly for transmitting a driving force of the motor to the annular cutter through the rotary shaft assembly;

a feed mechanism responsive to an operation of a manual handle, for moving the rotary shaft assembly along with a straight line to advance or retract the annular cutter attached to the rotary shaft assembly with respect to a workpiece; and an adhesion base disposed below a body of the electric drill apparatus for securing the electric drill apparatus to the workpiece.

In an embodiment of the electric drill apparatus, it further comprises an automatic motor stopping/re-driving mechanism which comprises: a main switching element connected in series between the motor and a power supply; a current detector for detecting a load current flowing through the motor; a determination unit for determining whether the load current detected by the current detector exceeds a first predetermined reference value; and a control unit for controlling the main switching element to turn on/off, wherein when the determination unit determines that the load current exceeds the first reference value, the control unit turns off the main switching element to shut off the current flowing through the motor, and subsequently when the determination unit determines that the load current decreases to be smaller than the first reference value, the control unit turns on the main switching element at a predetermined time after the determination, to supply the current from the power supply to the motor. It is preferable that the adhesion base preferably comprises a magnetic base having a magnet, and/or that the rotating shaft of the rotary shaft assembly is substantially perpendicular to the rotating shaft of the motor.

In a second aspect, the present invention further provides an electric drill apparatus, which comprises:

a motor for rotating an annular cutter;

a main switching element connected in series between the motor and a power supply;

a current detector for detecting a load current flowing through the motor;

a determination unit for determining whether the load current detected by the current detector exceeds a first predetermined reference value; and a control unit for controlling the main switching element to turn on/off, wherein when the determination unit determines that the load current exceeds the first reference value, the control unit turns off the main switching element to shut off the current flowing through the motor, and subsequently when the determination unit determines that the load current decreases to be smaller than the first reference value, the control unit turns on the main switching element at a predetermined time after the determination, to supply the current from the power supply to the motor.

In an embodiment of the electric drill apparatus of the second aspect, it further comprises: a rotary shaft assembly for rotating the annular cutter attached to its leading end about a rotating shaft which rotates in a direction different from that of a rotating shaft of the motor. In this embodiment, it is preferable that the rotating shaft of the rotary shaft assembly is substantially perpendicular to the rotating shaft of the motor.

In an embodiment of the electric drill apparatus of the second aspect, the annular cutter comprises cutting blades comprised of cemented carbide chips fixed on its lower end and at positions opposing a plurality of swarf exhaust grooves, respectively.

In an embodiment of the electric drill apparatus of the second aspect, it further comprises: a second determination unit for determining whether the load current detected by the current detector exceeds a second reference value lower than the first reference value; and a load condition indication unit for indicating a normal load condition when the second determination unit determines that the load current does not exceed the second reference value, and indicating an overload condition when the second determination unit determines that the load current exceeds the second reference value. In this embodiment, it is preferable that the current detector is a fixed resistor connected in series with the motor and the main switching element to output a voltage obtained across the resistor correspondingly to the load current, and the second determination unit is adapted to receive the voltage corresponding to the load current, and compare the voltage with a second reference voltage corresponding to the second reference value to determine whether the load current exceeds the second reference value.

In an embodiment of the electric drill apparatus of the second aspect, the current detector is a fixed resistor connected in series with the motor and main switching element to output a voltage obtained across the resistor correspondingly to the load current, and the first determination means is adapted to receive the voltage corresponding to the load current, and compare the voltage with a first reference voltage corresponding to the first reference value to determine whether the load current exceeds the first reference value.

In an embodiment of the electric drill apparatus of the second aspect, the control unit comprises: an on-state self hold unit including a first switching element, for holding the first switching element in an on-state when a starting switch is turned on; a control signal supply unit for supplying an on-control signal for turning on the main switching element when the first switching element is in the on-state; a second switching element which turns on when the first determination unit determines that the load current exceeds the first reference value, to prevent the control signal supply means from generating the on-control signal irrespective of the first switching element being in the on-state; and a unit, responsive to the determination by the first determination unit that the load current is reduced below the first reference value after the load current exceeded the first reference value, for turning off the second switching element at a predetermined time after the determination.

In an embodiment of the electric drill apparatus of the second aspect, the main switching element is a triac, and the control unit comprises: an on-state self hold unit including a first switching transistor, for holding the first switching transistor in an on-state when a starting switch is turned on; a photodiode for emitting light by being supplied with a current when the first switching transistor is in the on-state; a photo-triac connected between a gate and an anode or a cathode of the triac and optically coupled to the photodiode so that the photo-triac is turned on by light emitted by the photodiode to supply the triac with a gate current; a second switching transistor, responsive to the determination by the first determination unit that the load current exceeds the first reference value, for bypassing a current of the photodiode to extinguish the photodiode irrespective of the first switching transistor being in the on-state; and a unit, responsive to the determination by the first determination unit that the load current is reduced below the first reference value after the load current exceeded the first reference value, for turning off the second switching transistor at a predetermined time after the determination.

DETAILED DESCRIPTION OF THE EMBODIMENTS

Figure 1:
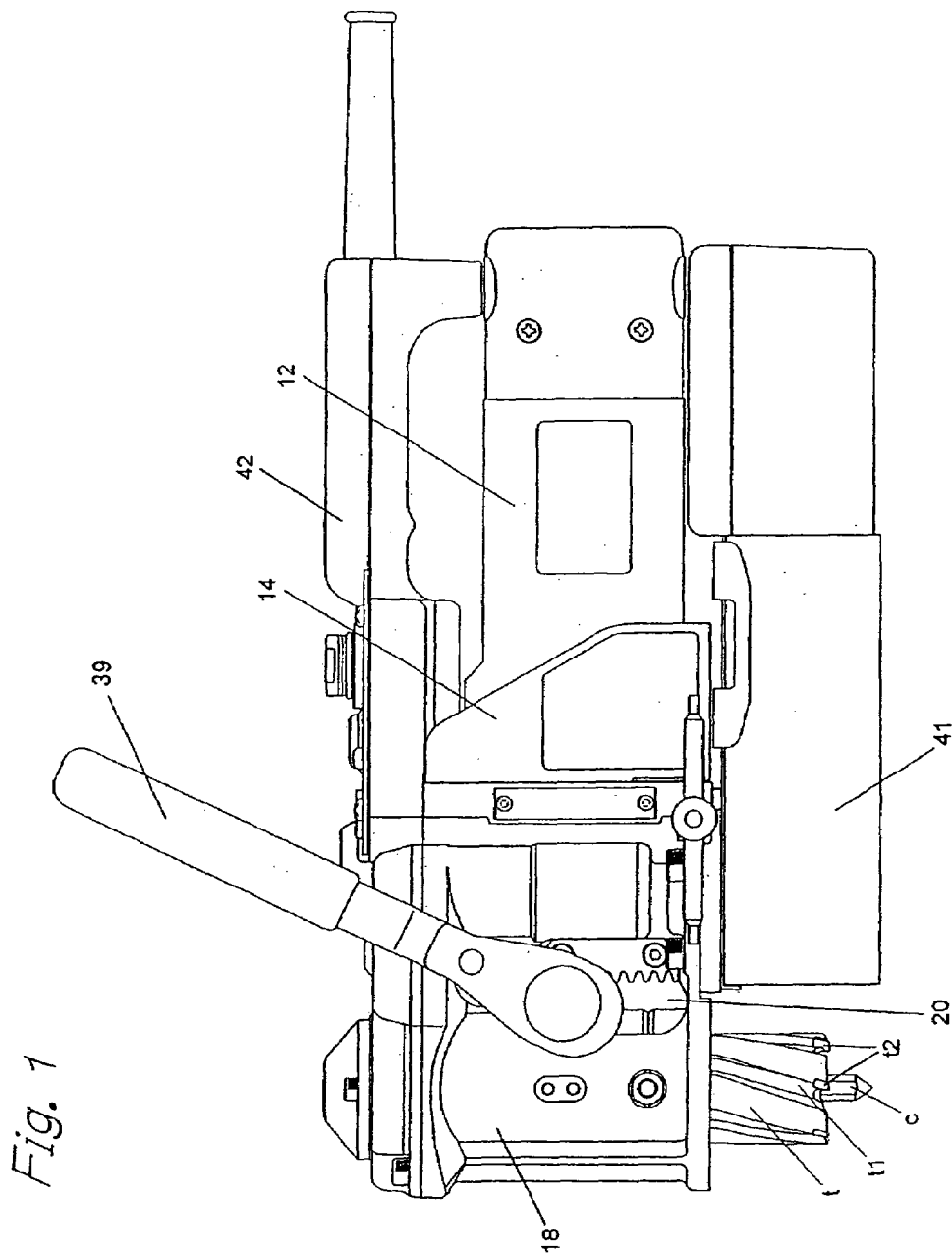
FIG. 1 is a perspective view illustrating an appearance of an electric drill apparatus having a low profile according to an embodiment of the present invention.
Figure 2:
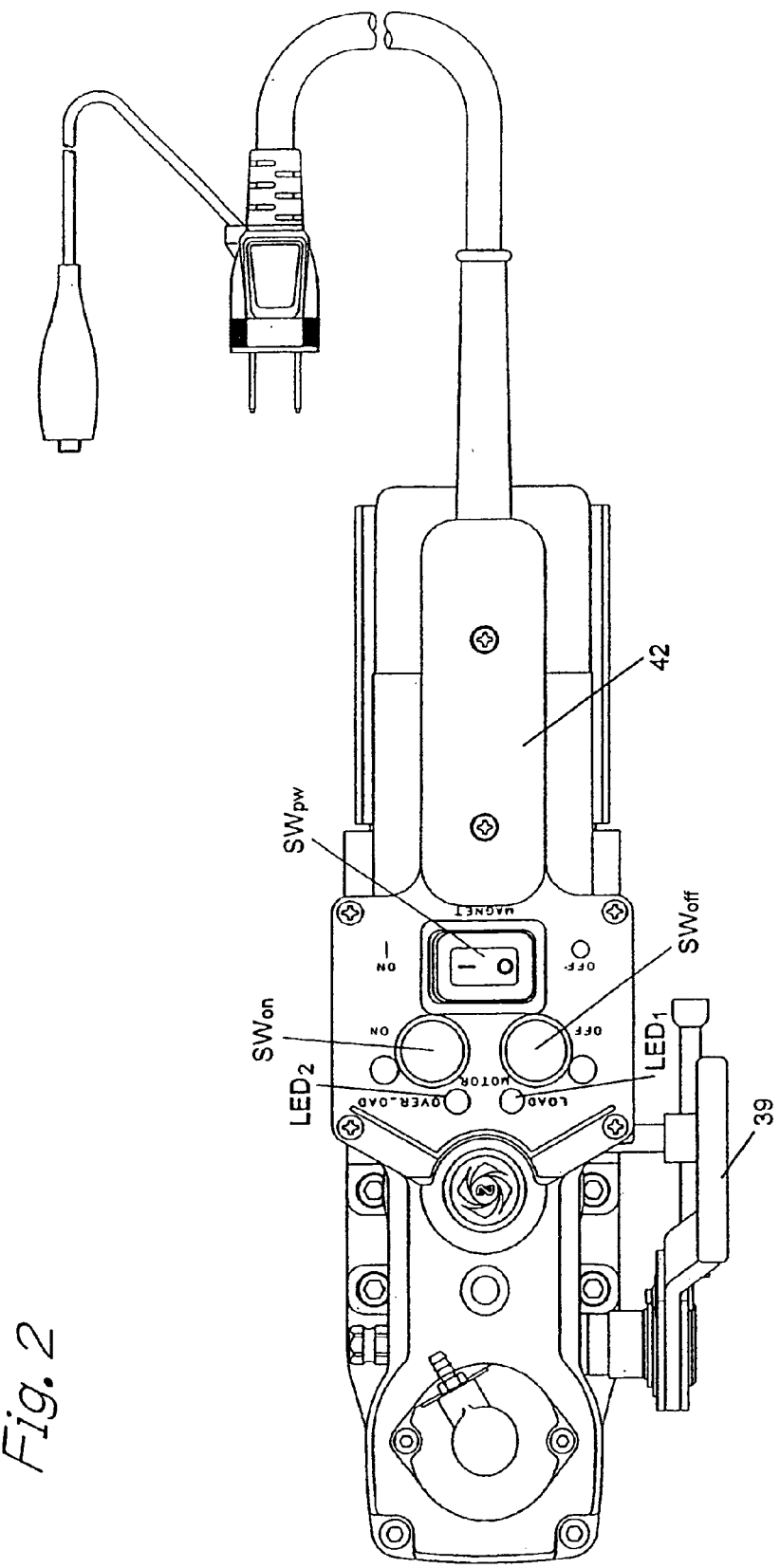
FIG. 2 is a lateral view of the electric drill apparatus illustrated in FIG. 1.
Figure 3:
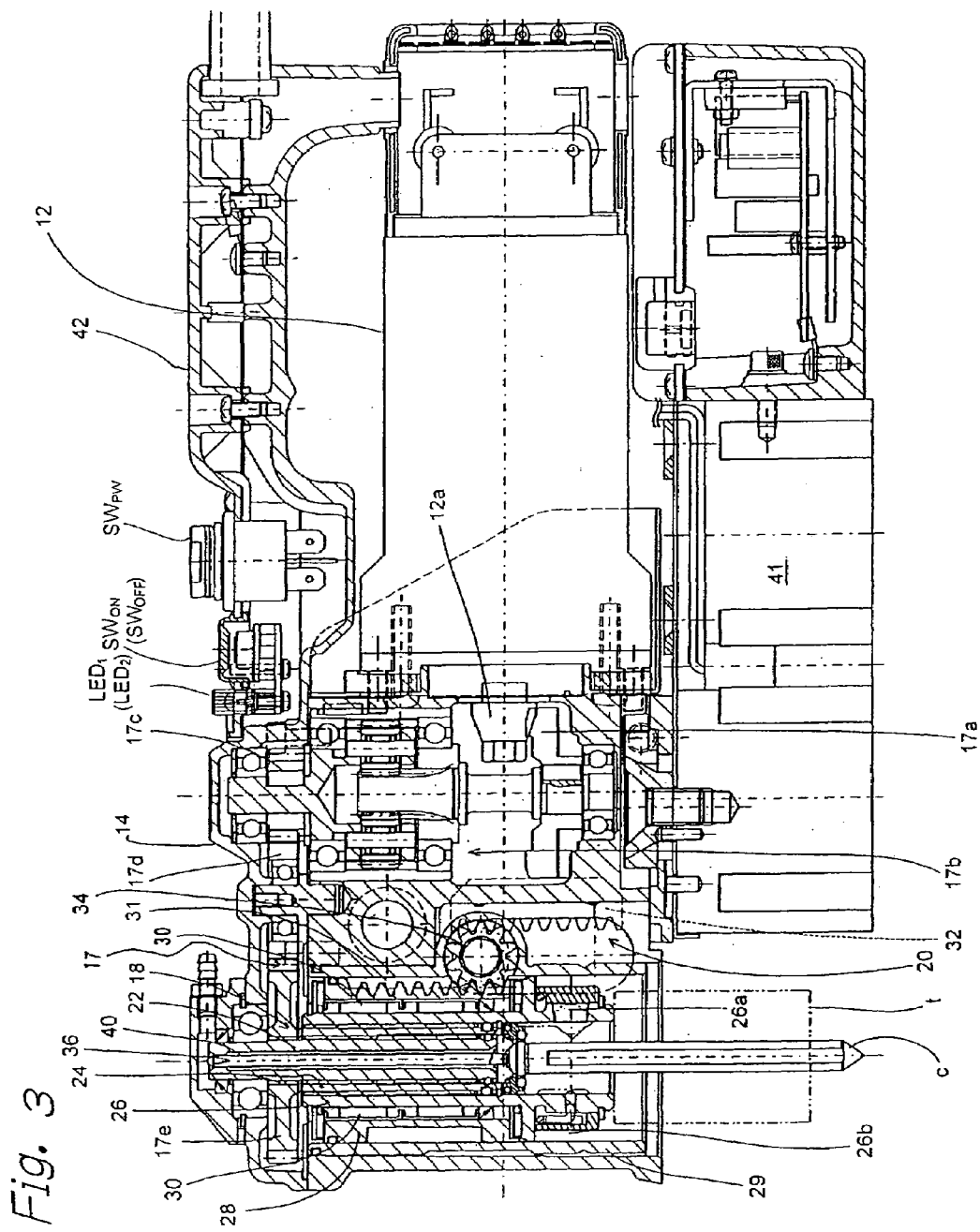
FIG. 3 is a cross-sectional view of the electric drill apparatus illustrated in FIGS. 1 and 2.

With reference to FIGS. 1–3 respectively showing front, plan and cross-sectional views, there will now be explained an electric drill apparatus having a low profile according to one embodiment of the present invention.

As shown in FIG. 1, the electric drill apparatus according to the present invention comprises a body 14 which contains a drill motor 12; a rotary shaft assembly 18 for rotating an annular cutter t attached on a lower end of the assembly 18; a feed (or slide) mechanism 20 for advancing and retracting the annular cutter t; and an electromagnetic base 41 held on a bottom of the body 14 and containing an electromagnet(s) for securing the body 14 on a steel material or the like which is to be drilled. The electric drill apparatus also comprises a manual operation lever 39 for driving the feed mechanism 20, and a handle 42 over the motor 12 at an upper position of the body 14. The motor 12 is fixed in the body 14 such that its output shaft is oriented horizontally.

As illustrated in FIG. 2, a power supply switch $SW_{PW}$ is disposed on the top surface of the handle 42. An instantaneously returning start switch $SW_{on}$ and stop switch $SW_{off}$ are also disposed on the top surface of the handle 42 for starting and stopping the motor 12, respectively. Further, indicator lamps LED1, LED2 are disposed on the top surface of the handle 42 for indicating a load current condition of the motor 12. As will be described later in greater detail, the LED 1, when turned on, indicates that the load current is normal, while the LED 2, when turned on, indicates an overload (light or heavy) condition.

As an operator turns on the power supply switch $SW_{PW}$, electric power conducts to the electromagnet 53 (FIG. 4) in the electromagnet base 41, thereby securing the electric drill apparatus to a workpiece. The magnetic base 41 is preferably configured to be adjustable in a position relative to the body 14. By making the relative position adjustable, after the magnetic base 41 is secured on a workpiece, the body 14 can be moved for centering of the annular cutter t to the workpiece.

Referring to FIG. 3, the deceleration mechanism 17, which is connected between an output shaft 12a of the motor 12 and the rotary shaft assembly 18, comprises a bevel gear 17a, a planetary gear decelerator 17b, and flat gears 17c, 17d, 17e. The deceleration mechanism 17 decelerates the rotation of the drill motor 12, and converts a rotation axis direction by 90° so that the rotary shaft assembly 18 has a rotating shaft extending in the vertical direction, which is rotated by 90° from the direction of the rotating shaft of the motor 12.

The rotary shaft assembly 18 comprises a proximal rotating shaft 22, an intermediate rotating shaft 24, a distal rotating shaft 26, and a holding cylinder 28. The proximal rotating shaft 22 is mounted to the body 14 for rotation about the vertical center axis and is connected to the flat gear 17e of the deceleration mechanism 17. The intermediate rotating shaft 24 is castellated to the rotating shaft 22 in a nesting configuration, and movable between an extended position (not shown) and a retracted position (as shown in FIG. 3). The intermediate shaft 24 slightly overlaps with the proximal rotating shaft 22 in the axial direction at the extended position, while it largely overlaps with the proximal rotating shaft 22 in the axial direction at the retracted position, and they are rotated together with the proximal rotating shaft 22. The distal rotating shaft 26 is castellated to the intermediate rotating shaft 24 in a nesting configuration, and is movable between an extended position (not shown) at which it slightly overlaps with the intermediate rotating shaft 24 in the axial direction and a retracted position (as shown in FIG. 3) at which it largely overlaps with the intermediate rotating shaft 24 in the axial direction. The distal rotating shaft 26 is rotated together with the intermediate rotating shaft 24. The holding cylinder 28 holds the distal rotating shaft 26 rotatably and is mounted to the body 14 so as to move in the axial direction together with the distal rotating shaft 26. The holding cylinder 28 is axially movably supported while it is prevented from rotating by a guide cylinder 29 fixed in the body 14.

A needle bearing 30 is interposed between the distal rotating shaft 26 and holding cylinder 28. A locking ball (locking member) 26a is attached to the leading end of the distal rotating shaft 26 for holding the annular cutter t. A rotation operation sleeve 26b is also provided for operating the locking ball 26a.

As illustrated in FIG. 3, the feed mechanism 20 comprises a movable rack 31 mounted on the outer surface of the holding cylinder 28 and extending in parallel with the axial of the rotary shaft assembly 18; a stationary rack 32 fixed on the body 14 spaced away from and in parallel with the movable rack 31; and a pinion 34 disposed between the two racks 31, 32 in mesh therewith.

When no drilling operation is performed, the elements of the rotary shaft assembly 18 stay at the retracted position as shown in FIG. 3. Then, for performing a drilling operation, while the annular cutter t is rotated by the drill motor 12 through the deceleration mechanism 17 and the proximal rotating shaft 22, intermediate rotating shaft 24, and distal rotating shaft 26, the operation lever 39 is manipulated, thereby causing the pinion 34 to rotate and advance downward on the stationary rack 32 to move the movable rack 31 downward relative to the pinion 34. In this way, the intermediate rotating shaft 24 and distal rotating shaft 26 are set into an extending state to bring the rotary shaft assembly 18 into an extending state, causing the annular cutter t attached at the leading end of the distal rotating shaft 26 to advance toward a workpiece.

Alternatively, a drill feed motor may be contained such that the rotation of the motor is transmitted to the feed mechanism 20 through a clutch for moving up and down the annular cutter t. In this way, a selection can be made as to whether or not the clutch is disconnected to manually or automatically move the annular cutter t downward.

As illustrated in FIG. 1, a plurality of cutting blades t2 each comprised of a cemented carbide tip are fixed at positions that oppose swarf exhaust grooves t1, respectively. By fixing the cutting blades t2 comprised of cemented carbide tips to the cutting edge of the annular cutter t, the rotational speed can be increased without causing chipping of the cutting edge and the like, as compared with an annular cutter made of high speed steel. Therefore, a cutting resistance can be reduced and the cutting speed can be increased.

Consequently, the electric drill apparatus which uses the annular cutter with the cemented carbide tips as in the present invention, can increase a drill feed amount, and accordingly improves a throughput of the drilling operation.

A cutting speed suitable for use with an annular cutter having cemented carbide tips, and a cutting speed suitable for use with an annular cutter made of high speed steel are described in "How to Select and Use Tools," P. 16 (First Edition, published by Kabushiki Kaisha Taiga Shuppan).

The motor 12 is selected such that it can rotate at high speeds (for example, four times higher than the prior art example) and is suitable for performing cutting operations employing the annular cutter with cemented carbide chips.

Figure 4:
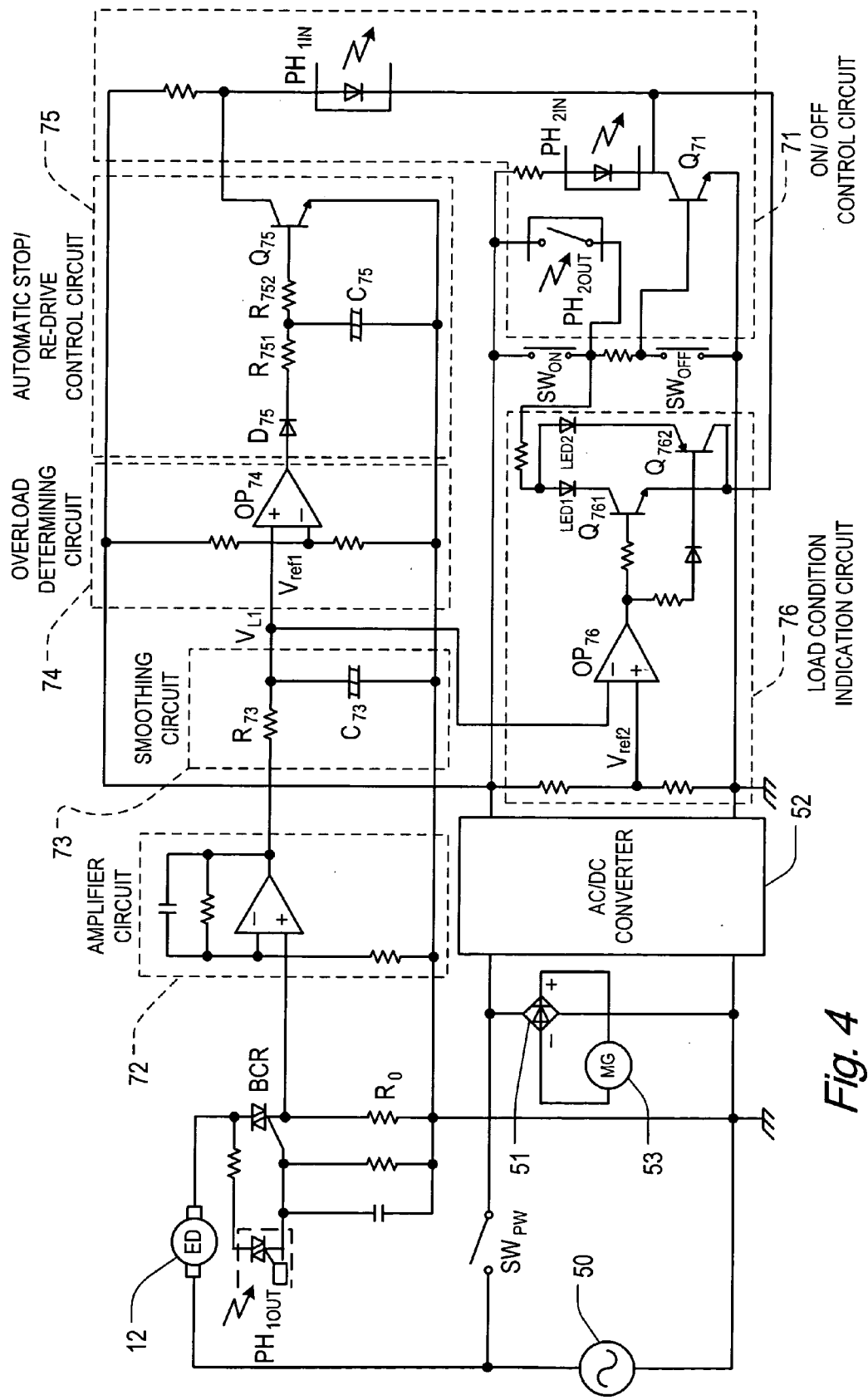
FIG. 4 shows a circuit diagram of a drill motor controller in an electric drill apparatus according to the present invention.

Referring next to FIG. 4, description will be made of a configuration and operation of a drill motor controller for driving/stopping the motor 12 of the electric drill apparatus illustrated in FIGS. 1–3.

In FIG. 4, the numeral 50 denotes an external AC power supply, 51 a full wave rectifier circuit, and 52 an AC/DC converter. The full wave rectifier circuit 51 applies power to an dectromagnet 53 contained in the electromagnetic base 41. When the power switch $SW_{PW}$ which is connected between the external AC power supply 50 and the AC/DC converter 52, is turned on, the full wave rectifier circuit 51 rectifies a voltage from the external AC power supply 50 and supplies the rectified voltage to the electromagnet 53, thereby fixing the electric drill apparatus onto a target object by the magnetic force. The AC/DC converter 52 converts the voltage from the external AC power supply 50 to a fixed DC voltage (for example, 24 volts) which is supplied to a control unit for controlling the driving of the drill motor 12.

A triac BCR is provided as a main switching element for connecting/disconnecting the drill motor 12 to the external AC power supply 50. A photo-triac $PH_{out}$ is connected between a gate terminal and an anode (or cathode) terminal of the triac BCR. A resistor (current detecting resistor) $R_0$ is connected in series with the triac BCR for detecting a load current flowing through the drill motor 12 and triac BCR.

The control unit, which is applied with the DC voltage from the AC/DC converter 52, comprises an ON/OFF control circuit 71, an amplifier circuit 72, a smoothing circuit 73, an overload determination circuit 74, an automatic stop/re-drive control circuit 75, and a load condition indication circuit 76.

The ON/OFF control circuit 71 outputs a control signal for turning the triac BCR on/off in response to a manipulation on the starter switch $SW_{ON}$ or the stopper switch $SW_{OFF}$, or in response to the output of the automatic stop/re-drive control circuit 75.

The amplifier circuit 72 amplifies a voltage across the resistor $R_0$, and outputs the resulting voltage to the smoothing circuit 73. The amplifier circuit 72 has a small output impedance (substantially, zero), and can rapidly discharge a charge accumulated on a capacitor $C_{73}$ included in the smoothing circuit 73 through a resistor $R_{73}$ when the voltage across the resistor $R_0$ falls to a zero level. The amplifier circuit 72 has a gain equal to or more than 1.

The overload determination circuit 74 determines whether or not an output $V_{L1}$ of the smoothing circuit 73 exceeds a previously set reference voltage $V_{ref1}$ to judge whether or not the drill motor 12 is in such a heavily overloaded condition that the drill motor 12 may be damaged.

The automatic stop/re-drive control circuit 75 controls the ON/OFF control circuit 71 with its output to automatically stop driving of the drill motor 12 when the output $V_{L1}$ of the overload determination circuit 74 indicates a heavy overload condition (or $V_{ref1} > V_{L1}$), and automatically re-drives the drill motor 12 after a predetermined time period from the time at which the driving of the drill motor 12 is automatically stopped.

The load condition indication circuit 76 determines whether or not the output $V_{L1}$ of the smoothing circuit 73 exceeds a previously set reference voltage $V_{ref2}$ to indicate a load condition of the drill motor 12 through the $LED_1$ and $LED_2$. The reference voltage $V_{ref2}$, which is lower than the reference voltage $V_{ref1}$ in the overload determination circuit 74, is set so as to invert the output of a comparator $OP_{76}$ when the drill motor 12 is lightly overloaded and will not be damaged. The $LED_1$ (for example, in blue) is turned on in a normal load condition, while the $LED_2$ (for example, in red) is turned on in a lightly or more overload condition. Instead of the $LED_2$, two LEDs may be provided to indicate light and heavy overload conditions, respectively.

In the circuit as described above, as an operator turns on the starter switch $SW_{ON}$ while the power switch $SW_{PW}$ remains in an on-state so that the control unit is applied with a DC supply voltage from the AC/DC converter 52, a base current of a transistor $Q_{71}$ of the ON/OFF control circuit 71 flows from the AC/DC converter 52 through the starter switch $SW_{ON}$, thereby causing the transistor $Q_{71}$ turned on. As a result, a current flows through a photo-diode $PH_{21N}$ to turn on a photo-relay $PH_{20UT}$ which is optically coupled to the photo-diode $PH_{21N}$, thereby forming a self-holding circuit for the transistor $Q_{71}$.

As the transistor $Q_{71}$ is turned on, a current also flows through a photo-diode $PH_{1IN}$ connected in series with the transistor $Q_{71}$, causing a photo-triac $PH_{1OUT}$ which is optically coupled to the photo-diode $PH_{1IN}$ to be turned on. By turning on the triac BCR, the AC power supply 50 is connected to the drill motor 12 to be driven. As a result, the rotation of the drill motor 12 is conveyed through the reduction gear mechanism 17 to the rotary shaft assembly 18 to thereby rotate the annular cutter t (see FIGS. 1 and 3).

In this state, as the operator manually operates the handle 39 (see FIG. 1) to drive the feed mechanism 20, the annular cutter t is moved, while it is rotating, toward an object to form a bore therethrough.

A load current flowing through the drill motor 12 is detected as a voltage drop across the current detection resistor $R_0$, and the voltage proportional to the load current is amplified by the amplifier circuit 72 and supplied to the smoothing circuit 73. Since the reference voltage $V_{ref1}$ of the overload determination circuit 74 is set to be higher than the output voltage $V_{L1}$ of the smoothing circuit 73 in a normal condition in which the drill motor 12 is not overloaded, the comparator (operational amplifier) $OP_{74}$ of the overload determination circuit 74 outputs a low level. Therefore, in the normal condition, a low voltage is charged on the capacitor $C_{75}$ of the automatic stop/re-drive control circuit 75, so that a base current of a transistor $Q_{75}$ does not flow and therefore it remains in an off-state.

In this state, since a current continuously flows into the photo-diode $PH_{1IN}$ of the ON/OFF control circuit 71 through the transistor $Q_{71}$, the photo-triac $PH_{1OUT}$ remains in an on-state, thereby permitting the triac BCR to remain in an on-state.

The reference voltage $V_{ref2}$ set in the load condition indication circuit 76 is higher than the output $V_{L1}$ of the smoothing circuit 73 in the normal condition, so that the output of the comparator (operational amplifier) $OP_{76}$ is at high level. Therefore, a transistor $Q_{761}$ and thus the $LED_1$ are turned on, while a transistor $Q_{762}$ and thus the $LED_2$ are turned off. From the lit $LED_1$ and unlit $LED_2$, the operator can recognize that the drill motor 12 is in the normal load condition.

On the other hand, as the drill motor 12 is overloaded to cause an increase in the load current, the voltage across the current detection resistor $R_0$ increases, causing an increase in the output $V_{L1}$ of the smoothing circuit 73. As the output $V_{L1}$ increases to the reference voltage $V_{ref2}$ of the load condition indication circuit 76, the output of the comparator $OP_{76}$ transitions from high level to low level. This causes the transistor $Q_{761}$ to turn off and the transistor $Q_{762}$ to turn off, so that the $LED_1$ is turned off and the $LED_2$ is turned on. From the unlit $LED_1$ and lit $LED_2$, the operator can recognize that the drill motor 12 is lightly overloaded, and can therefore control a force applied to the handle 39 as required.

As the drill motor 12 is further loaded to a heavily overloaded condition in which the drill motor 12 may be damaged, the output $V_{L1}$ of the smoothing circuit 73 increases to the reference voltage $V_{ref1}$ of the overload determination circuit 74 or higher. Then, at this time, the comparator $OP_{74}$ of the overload determination circuit 74 outputs a high level which substantially instantaneously charges the capacitor $C_{75}$ through a diode $D_{75}$ and a resistor $R_{751}$ (having a small resistance) in the automatic stop/re-drive control circuit 75, causing a current to flow through a resistor $R_{752}$ and the base-emitter of the transistor $Q_{75}$. As the transistor Q75 turns on, a current flowing through the photo-diode $PH_{1IN}$ of the ON/OFF control circuit 71 is shunted to consequently turn off the photo-triac $PH_{1OUT}$. As the current of the triac BCR decreases to its holding current or less, it is turned off to shut off the current to the drill motor 12.

When a heavily overloaded condition causes the automatic stop/re-drive control circuit 75 to turn off the triac BCR, the voltage drop by the current detection resistor $R_0$ decreases to zero to reduce the output $V_{L1}$ of the smoothing circuit 73, so that the output of the comparator $OP_{74}$ in the overload determination circuit 74 transitions from high level to low level. As a result, in the automatic stop/re-drive control circuit 75, the base current of the transistor $Q_{75}$ only comprises a discharge current from the capacitor $C_{75}$ through the resistor $R_{752}$. Then, the base current disappears after a time period determined by a discharge time constant, causing the transistor $Q_{75}$ to turn off.

In this event, since the self-holding circuit for the transistor $Q_{71}$ is still formed by the photo-diode $PH_{2IN}$ and photo-relay $PH_{2OUT}$ in the ON/OFF control circuit 71, the transistor $Q_{71}$ remains in on-state. Therefore, when the transistor $Q_{75}$ turns off after a predetermined time period from the transition of the output from the overload determination circuit 74, a current flows again into the photo-diode $PH_{1IN}$ through the transistor $Q_{71}$, causing the photo-triac $PH_{1OUT}$ to again turn on and eventually the triac BCR to turn on. In this way, the drill motor 12 is again powered to rotate the annular cutter t. The discharge time constant of the automatic stop/re-drive control circuit 75 is preferable to be set, for example, approximately in a range of 0.3 to 0.5 seconds. It is therefore possible to automatically resume powering the drill motor 12 in a short time after the drill motor 12 is overloaded and a current flowing therethrough is automatically shut off.

Also, since the output $V_{L1}$ of the smoothing circuit 73 decreases at the time the drill motor 12 is released from the overloaded condition, the output of the comparator $OP_{76}$ in the load condition indication circuit 76 transitions from low level to high level, so that the $LED_1$ is turned on while the $LED_2$ is turned off. In this way, the operator can know without fail that the drill motor 12 is released from the overloaded condition, and can therefore operate the handle 39 to again move down the annular cutter t for resuming the formation of a bore through the object.

As described above, the electric drill apparatus according to the present invention can reduce a cutting resistance because it employs an annular cutter having cement carbide tips fixed on the cutting edge thereof, and the motor which can rotate the annular cutter at high speeds. Since this can reduce a counterforce, the following operational benefits can be provided by the low profile electric drill apparatus.

(a) The deceleration mechanism disposed between the motor and rotary shaft assembly can be designed to employ a low torque, with the result that the deceleration mechanism can be reduced in weight.

(b) Since a variety of parts such as gears, shafts and the like within the transmission mechanism can be reduced in capability, strength and rigidity, the apparatus can be further reduced in size and weight.

(c) The electric drill apparatus can be secured to a workpiece with a smaller adhesive force, so that the magnetic base, which comprises a relatively large capacity and weight of the electric drill apparatus, can be reduced in size and weight, thus significantly contributing to a reduction in size and weight of the overall electric drill apparatus.

As will be appreciated from the foregoing, the present invention can stably secure the electric drill apparatus to a workpiece, while achieving an overall reduction in size and weight of the overall apparatus.

Also, since the automatic motor stopping/re-driving means can automatically shut off a current to the motor in the event of overloading, and automatically drives the motor again at a predetermined time thereafter, an operator need not operate a switch for re-driving the motor, thus improving workability.

Further, when the drill motor is normally re-driven, an operator can be informed of the condition, so that the operator can readily know a time at which he can start operating the handle for feeding the drill downwardly.

Furthermore, since the low profile type electric drill apparatus according to the present invention can increase the rotational speed of the drill motor to reduce a cutting resistance by use of the cement carbide tips fixed on the cutting edge, the drill motor is capable of rotating at high speeds, so that an operator tends to increase the feed amount. Though the motor may be subject to overloading for the above reason, the automatic motor stopping/re-driving means provided in the electric drill apparatus is able to prevent the drill motor and annular cutter from being damaged or broken due to overloading.

While the electric drill apparatus according to the present invention has been described with reference to one embodiment, it will be apparent to those skilled in the art that a variety of modifications and alternations can be made to the invention.

For example, the control circuit illustrated in FIG. 4 can be applied to any electric drill apparatus including a vertically arranged type, similarly to the lower profile type electric drill apparatus shown in FIGS. 1–3.

Further, in the control circuit, instead of the photo-coupler, an alternative electronic switch means or mechanical relay means may be employed. Also, instead of the current detection resistor $R_0$ connected in series with the drill motor 12, a current transformer may be employed for detecting a current through the drill motor 12. Instead of the triac BCR, a photo-relay or a mechanical relay may be employed. Any time measuring means such as a pulse counter may be employed instead of the RC time constant circuit in the automatic stop/re-drive control circuit 75. Further more, the drill motor 12 may be implemented by a DC motor, and SCR, transistor or FET may be employed instead of the triac.

While specific embodiments of an electric drill according to the present invention have been described, it is to be understood that the invention is not limited by any of the details of the descriptions of the embodiments, but rather is to be construed broadly within its spirit and scope as set out in the accompanying claims.

What is claimed is:

1. An electric drill apparatus having a low profile, comprising:
    an annular cutter for cutting at a high rotational speed, and having a plurality of cutting blades comprised of cemented carbide tips fixed on its lower end,
    a motor for rotating at a high speed suitable for a cutting operation of the annular cutter with the cemented carbide tips;
    a rotary shaft assembly for rotating the annular cutter attached to its leading end about an axis, the direction of which is different from that of an axis of a rotating shaft of the motor;
    a rotation reduction mechanism disposed between the motor and rotary shaft assembly for transmitting a driving force of the motor to the annular cutter through the rotary shaft assembly;
    a feed mechanism responsive to an operation of a manual handle, for moving the rotary shaft assembly along with a straight line to advance or retract the annular cutter attached to the rotary shaft assembly with respect to a work piece;

an adhesion base disposed below a body of the electric drill apparatus for securing the electric drill apparatus to the work piece; and an automatic motor stopping/re-driving mechanism comprising:
- a main switching element connected in series between the motor and a power supply;
- a current detector for detecting a load current flowing through the motor;
- a determination unit for determining whether the load current detected by the current detector exceeds a first predetermined reference value; and
- a control unit for controlling the main switching element to turn on/off, wherein when the determination unit determines that the load current exceeds the first reference value, the control unit turns off the main switching element to shut off the current flowing through the motor, and subsequently when the determination unit determines that the load current decreases to be smaller than the first reference value, the control unit turns on the main switching element at a predetermined time after the determination, to supply the current from the power supply to the motor.

2. An electric drill apparatus according to claim 1, wherein the adhesion base comprises a magnetic base having a magnet.

3. An electric drill apparatus according to claim 1, wherein the axis of the rotary shaft assembly is substantially perpendicular to the rotating shaft of the motor.

4. An electric drill apparatus, comprising:
- an annular cutter;
- a motor for rotating the annular cutter;
- a rotary shaft assembly for rotating the annular cutter attached to its leading end about an axis, the direction of which is different from that of an axis of a rotating shaft of the motor;
- a feed mechanism responsive to an operation of a manual handle, for moving the rotary shaft assembly along with a straight line to advance or retract the annular cutter attached to the rotary shaft assembly with respect to a workpiece;
- a main switching element connected in series between the motor and a power supply;
- a current detector for detecting a load current flowing through the motor;
- a first determination unit for determining whether the load current detected by the current detector exceeds a first predetermined reference value; and
- a control unit for controlling the main switching element to turn on/off, wherein when the first determination unit determines that the load current exceeds the first reference value, the control unit turns off the main switching element to shut off the current flowing through the motor, and subsequently when the first determination unit determines that the load current decreases to be smaller than the first reference value, the control unit turns on the main switching element only after waiting at least a predetermined time after the determination, to supply the current from the power supply to the motor.

5. An electric drill apparatus according to claim 4, further comprising:
- a rotary shaft assembly for rotating the annular cutter attached to its leading end about an axis, the direction of which is different from that of an axis of a rotating shaft of the motor.

6. An electric drill apparatus according to claim 5, wherein the axis of the rotary shaft assembly is substantially perpendicular to the rotating shaft of the motor.

7. An electric drill apparatus according to claim 4, wherein the annular cutter comprises cutting blades comprised of cemented carbide chips fixed on its lower end and at positions opposing a plurality of swarf exhaust grooves, respectively.

8. An electric drill apparatus according to claim 4, further comprising:
- a second determination unit for determining whether the load current detected by the current detector exceeds a second reference value lower than the first reference value; and
- a load condition indication unit for indicating a normal load condition when the second determination unit determines that the load current does not exceed the second reference value, and indicating an overload condition when the second determination unit determines that the load current exceeds the second reference value.

9. An electric drill apparatus according to claim 4, wherein
- the current detector is a fixed resistor connected in series with the motor and main switching element to output a voltage obtained across the resistor correspondingly to the load current, and
- the first determination unit is adapted to receive the voltage corresponding to the load current, and compare the voltage with a first reference voltage corresponding to the first reference value to determine whether the load current exceeds the first reference value.

10. An electric drill apparatus according to claim 8, wherein
- the current detector is a fixed resistor connected in series with the motor and the main switching element to output a voltage obtained across the resistor correspondingly to the load current, and
- the second determination unit is adapted to receive the voltage corresponding to the load current, and compare the voltage with a second reference voltage corresponding to the second reference value to determine whether the load current exceeds the second reference value.

11. An electric drill apparatus according to claim 4, wherein the control unit comprises:
- an on-state self hold unit including a first switching element, for turning on the first switching element when a starting switch is turned on, and holding it in the on-state even after the starting switch is turned off
- a control signal supply unit for supplying an on-control signal for turning on the main switching element when the first switching element is in the on-state;
- a second switching element which turns on when the first determination unit determines that the load current exceeds the first reference value, to prevent the control signal supply means from generating the on-control signal even when the first switching element is in the on-state; and
- a unit, responsive to the determination by the first determination unit that the load current is reduced below the first reference value after the load current exceeded the first reference value, for turning off the second switching element at a predetermined time after the determination.

12. An electric drill apparatus according to claim 4, wherein the main switching element is a triac, and the control unit comprises:

an on-state self hold unit including a first switching transistor, for turning on the first switching transistor when a starting switch is turned on, and holding it in the on-state even after the starting switch is turned off a photodiode for emitting light by being supplied with a current when the first switching transistor is in the on-state;

a photo-triac connected between a gate and an anode or a cathode of the triac and optically coupled to the photodiode so that the photo-triac is turned on by light emitted by the photodiode to supply the triac with a gate current;

a second switching transistor, responsive to the determination by the first determination unit that the load current exceeds the first reference value, for bypassing a current of the photodiode to extinguish the photodiode even when the first switching transistor is in the on-state; and a unit, responsive to the determination by the first determination unit that the load current is reduced below the first reference value after the load current exceeded the first reference value, for turning off the second switching transistor at a predetermined time after the determination.

13. An electric drill apparatus, comprising:

a motor for rotating an annular cutter;

a main switching element connected in series between the motor and a power supply;

a current detector for detecting a load current flowing through the motor;

a determination unit for determining a first condition whether to turn the main switching element off and a second condition whether to turn the main switching element on; and a control unit for controlling the main switching element to turn on/off, wherein when the determination unit determines the first condition is met, the control unit turns off the main switching element to shut off the current flowing through the motor, and subsequently when the determination unit determines a second condition is met, the control unit turns on the main switching element after waiting at least a predetermined time after the determination, to supply the current from the power supply to the motor.

14. An electric drill apparatus according to claim 13, wherein the first condition comprises the load current exceeding a reference value and the second condition comprises the load current being less than the reference value.

15. An electric drill apparatus according to claim 4, wherein a main body of the annular cutter is substantially non-tapered.

16. An electric drill apparatus, comprising:

a motor for rotating an annular cutter;

a main switching element connected between the motor and a power supply;

a current detector for detecting a load current flowing through the motor;

a determination unit for determining whether the load current detected by the current detector exceeds a reference value to turn off the electric drill; and a control unit for controlling the main switching element to turn on/off, wherein when the determination unit determines that the load current exceeds the reference value to turn off the electric drill, the control unit turns off the main switching element to shut off the current flowing through the motor, and subsequently when the determination unit determines that the load current decreases to be smaller than a reference value to turn on the electric drill, the control unit turns on the main switching element after waiting at least a predetermined time after the determination, to supply the current from the power supply to the motor, wherein the control unit comprises:

an on-state self hold unit including a first switch, for turning on the first switch when a starting switch is turned on, and holding it in the on-state even after the starting switch is turned off a photodiode for emitting light when the first switch is in the on-state;

a second switch, responsive to the determination by the determination unit that the load current exceeds the reference value to turn off the electric drill, for modifying a current of the photodiode even when the first switch is in the on-state; and a unit, responsive to the determination by the determination unit that the load current is reduced below the reference value to turn on the electric drill after the load current exceeded the reference value to turn off the electric drill, for turning off the second switch at the predetermined time after the determination.

17. An electric drill apparatus according to claim 16, wherein the main switching element comprises a triac.

18. An electric drill apparatus according to claim 17, wherein the control unit further comprises a photo-triac connected between a gate and an anode or a cathode of the triac and optically coupled to the photodiode so that the photo-triac is turned on by light emitted by the photodiode to supply the triac with a gate current.

19. An electric drill apparatus according to claim 18, wherein the first switch comprises a switching transistor and the second switch comprises a second switching transistor.

20. An electric drill apparatus according to claim 19, wherein the second switch bypasses the current of the photodiode in order to extinguish the photodiode when the first determination unit determines that the load current exceeds the reference value to turn off the electric drill.

21. An electric drill apparatus according to claim 20, wherein the reference value to turn off the electric drill is equal to the reference value to turn on the electric drill.

* * * * *